Figure 1:
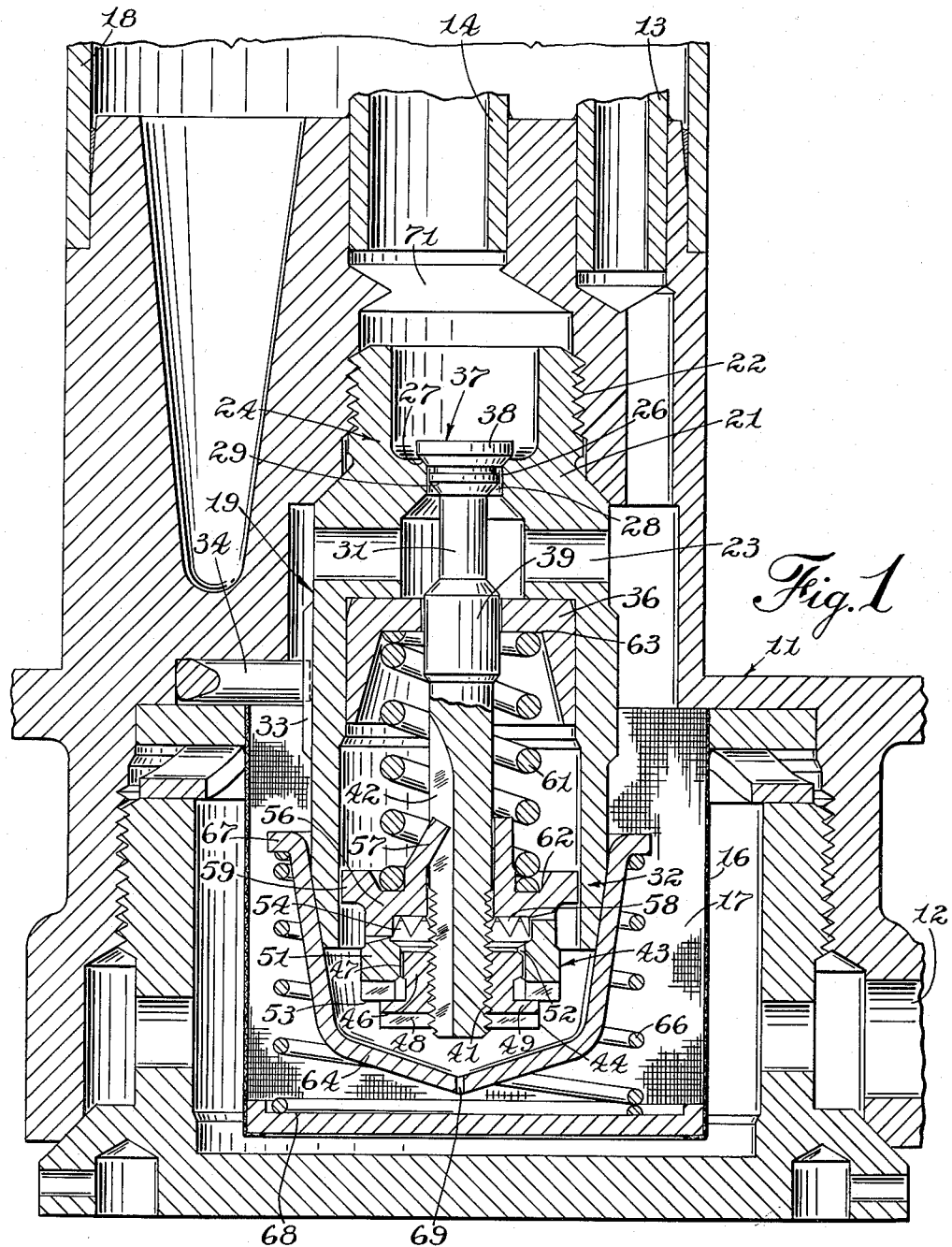

July 23, 1963  T. L. KUCMEROSKY ETAL  3,098,642
SPRING ADJUSTING MECHANISM FOR FLOW DIVIDER VALVE
Filed Feb. 1, 1961  2 Sheets-Sheet 2

WITNESS:
Esther M. Stockton

INVENTOR.
Theodore L. Kucmerosky
Merle E. Peterson
BY
John Phillips Ryan
ATTORNEY

United States Patent Office 3,098,642
Patented July 23, 1963

3,098,642
SPRING ADJUSTING MECHANISM FOR FLOW DIVIDER VALVE
Theodore L. Kucmerosky and Merle E. Peterson, Elmira, N.Y., assignors to The Bendix Corporation, Elmira Heights, N.Y., a corporation of Delaware
Filed Feb. 1, 1961, Ser. No. 86,437
3 Claims. (Cl. 267—1)

This invention relates to a flow divider valve for duplex or dual cone type of jet engine nozzles and more particularly relates to a nozzle divider valve incorporating an adjusting mechanism for achieving extremely fine changes in the rate of flow in a secondary fuel feed system.

Duplex and dual cone engine nozzles are designed primarily to reduce the wide fuel pressure range required in the simplex and spill types of nozzles as well as to improve the atomization and combustion efficiency of the fuel over these reduced fuel pressure ranges. In the past, duplex and dual cone nozzles have depended on inherent design features coupled with selective assembly and exhaustive testing in order to attain desired flow tolerances or characteristics. This cumbersome craft type of approach was not at all adaptable to mass production techniques nor could the ever increasing demand for quality jet engine nozzles be accommodated using these antiquated manufacturing methods.

Several other approaches have been tried and utilized in an attempt to provide nozzles by mass production methods which will meet exacting engine manufacturer's specifications. One obvious approach was to use finer threads on the valve stems thereby making the attainment of finer valve adjustments possible. This method initially solved the problem but introduced inherent mechanical, manufacturing and cost problems. In the meantime, the manufacturers developed newer types of engines demanding more exact flow rates and characteristics from the nozzles. To meet the more exacting specifications it became necessary to provide even finer fuel flow adjustments. These fine adjustments were eventually obtained by providing a single clutch in the adjusting means. The clutch consisted of serrations on an adjusting nut threadedly received on the finely threaded valve stem and an internally serrated piston member in the nozzle body. The nut serrations disengageably complemented serrations on a piston which was non-rotatably but slidably supported on the valve stem extremity. When the clutch was disengaged, the nut could be axially relocated on the stem to vary a spring force on the valve. As the flow tolerances became even more exacting this latter method of obtaining desired fuel flow rates and characteristics also became obsolete.

By utilizing the structure of the disclosed invention it is once again possible to provide a flow divider valve for jet engine nozzles which can be adjusted to an extremely fine degree to provide a fuel rate of flow within very specific ranges of fuel flow tolerances. It is proposed to introduce between the valve adjusting nut and the valve piston a vernier mechanism which will make the attainment of extremely fine valve adjustments possible. The vernier mechanism broadly comprises a substantially annular collar introduced between the adjusting nut and the piston. The collar's inner cylindrical surface is formed with a great number of circumferential inwardly extending serrations which complement and engage a like number of outwardly projecting radial serrations on a hub portion of the adjusting nut. When the hub and collar are concentrically disposed there is provided a first clutch connection. One radial face of the collar is formed with a plurality of dentils which engage similar dentils on an adjacent face of the piston member thereby providing a second clutch connection. There are many more serrations than there are dentils. A spring member in the nozzle's divider body maintains the clutch members normally engaged but is compressible to allow the disengagement of one or both of the clutches.

To obtain a major or rough fuel flow adjustment the piston is axially depressed thereby compressing the spring member. As a result of the spring compression the dentil clutch or second clutch is disengaged and the dentil faces are axially separated and, thereafter, the adjusting nut, which then supports the collar, can be threaded in either direction on the valve stem. This threading of the adjusting nut changes its relative position on the valve stem within the flow divider body by rotational increments equal to one or more of the dentils. Threading the nut axially inward on the stem further compresses the spring thus requiring a greater fuel pressure before the valve is actuated while axial outward movement of the nut reduces the spring pressure thus allowing the valve to be opened by a lesser fuel pressure. Once the major adjustment has been established, it is then possible to obtain finite adjustments to meet even more specific fuel flow tolerances. The minor or finite adjustments are obtained by simultaneously depressing the collar and piston thus maintaining the dentil clutch engagement. This depression compresses the spring and allows the serrated clutch or first clutch between the collar and the adjusting nut to be axially separated thereby enabling the adjusting nut to be threaded in either direction on the stem relative to the collar and piston. Since there are a great number of serrations the rotational change equal to just one serration will provide an extremely fine adjustment and provide a finite axial displacement which results in an equally finite increase or decrease in the force exerted by the compression spring.

Accordingly, it is a primary object of the invention to provide a flow divider valve adjusting mechanism that will permit an extremely fine adjustment in the rate of fuel flow in a secondary fuel feed system.

It is another object of the present invention to provide a flow divider valve which is simple and durable in construction, reliable and efficient in operation while being economical to manufacture and fabricate.

It is still another object of the invention to provide vernier means in a flow divider valve adjusting mechanism to permit extremely fine control of the valve opening and closing movements.

It is still a further object of the invention to provide a plurality of clutch means in a flow divider valve for a duplex type jet engine nozzle which provide means for obtaining finite graduations in the fuel flow to a secondary fuel feed system.

It is still a further object of the invention to provide a vernier collar member operatively connected to a flow divider valve which will provide a dentiled clutch member adapted to disengageably mesh with a dentiled clutch member on a divider piston member and which will provide a serrated clutch member adapted to disengageably mesh with a serrated clutch member on an adjusting nut, there being a greater number of serrations on the serrated clutch than there are dentils on the dentil clutch, thus providing an adjusting means capable of providing a large number of different valve settings.

The foregoing and other objects and advantages of the invention will appear more fully from consideration of the detailed description which follows, in conjunction with the accompanying drawings, wherein a single embodiment of the invention is illustrated. It is to be expressly understood, however, that the drawing is for the purpose of illustration and description and is not to be construed as defining the limits of the invention since the scope of the present invention is denoted in the appended claims.

Figure 2:
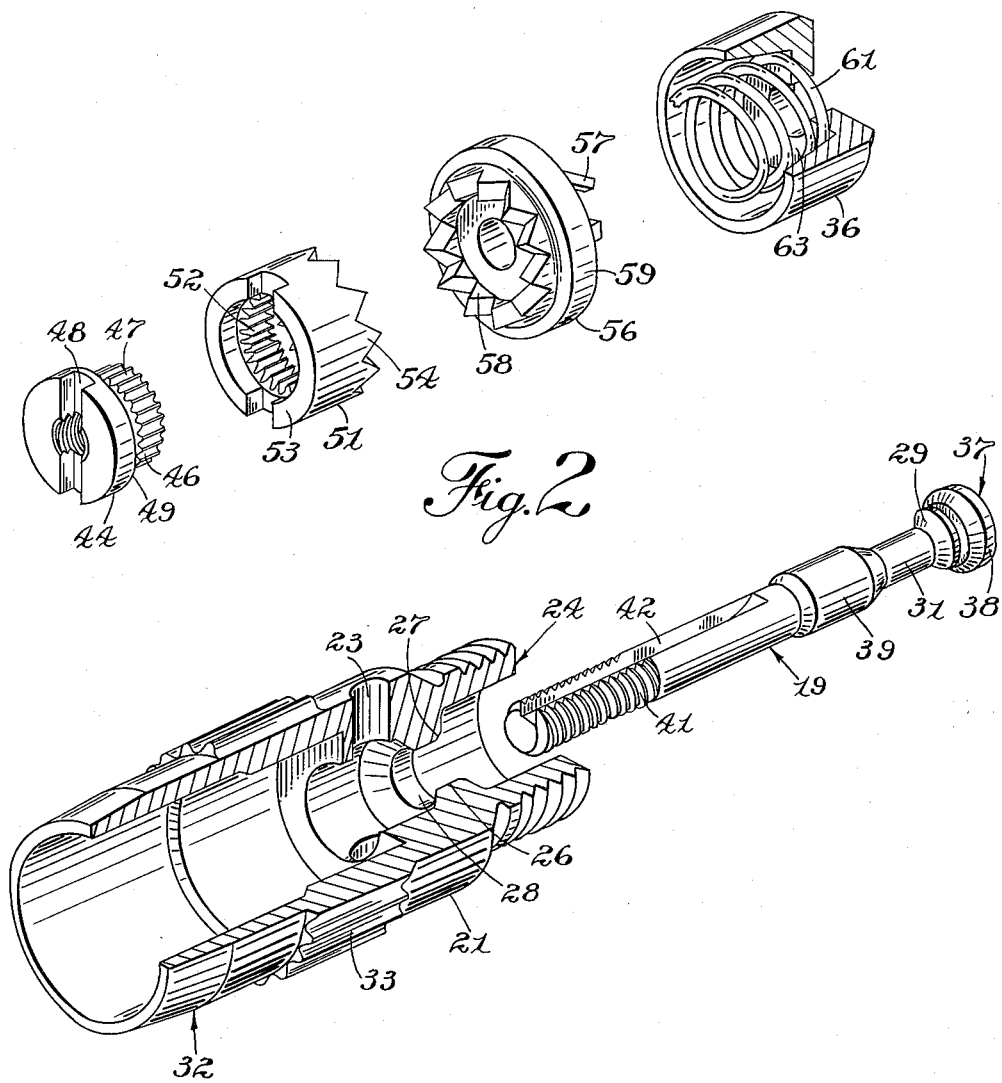

In the drawing:

FIGURE 1 is an enlarged fragmentary view, partly broken away and in section, of the divider valve end of a duplex nozzle for jet engines embodying the present invention; and FIGURE 2 is an enlarged and exploded detail perspective view, partly broken away and in section, of the flow divider valve and the vernier adjusting mechanisms therefor.

Referring now to the drawing wherein like reference numerals designate like or corresponding parts throughout the views, FIGURE 1 illustrates the divider valve end of a nozzle for jet engines generally designated as 11. The divider end of the nozzle is connected to a fuel supply inlet port 12. Fuel under varying pressures is distributed at the divider end of the nozzle to a primary tube 13, and, when the fuel pressure is of a sufficient magnitude, to secondary tube 14 and thence to a tip end of the nozzle (not shown). Fuel admitted to the nozzle through the fuel inlet port 12 prior to distribution to the primary and secondary tubes passes through a filter screen 16 into a nozzle reservoir area 17. Connected directly to the reservoir is the primary tube 13 which provides an unobstructed passage for the pressurized fuel to pass freely to the tip or front end of the nozzle. The primary and secondary tubes are protected between the divider valve end and tip by a nozzle shield 18 which is shown in a broken-away section (FIGURE 1).

Mounted in the rear or divider end of the nozzle is the flow divider valve generally designated at 19 which is actuated by predetermined pressure increases in the pressurized fuel supply. In duplex nozzles of this type, the control of the fuel and consequently the engine, is obtained by varying the fuel pressure. When the fuel pressure exceeds an exactly predetermined amount, the pressure will actuate the flow divider valve mechanisms and allow fuel to flow from the reservoir area through the secondary tube 14 to the tip nozzles and thence to the combustion chamber of the jet engine where it supplements the continuous primary fuel flow.

As previously stated, an object of the invention is to provide a fuel flow divider valve for a duplex nozzle which is controllable to an almost imperceptible degree whereby the fuel flow into the secondary tube can be accurately controlled within the very specific flow tolerances established by the jet engine manufacturers. To attain the stated objects there is provided a nozzle flow divider valve 19 comprising a flow divider body 21 threadedly received into the divider or rear end of the nozzle housing as at 22. The divider body 21 is a hollow open ended cylinder with fuel passage means 23 extending radially from the hollow center portion of the body into the fuel reservoir area 17. The forward extremity 24 of the body 21 is provided with a radially inwardly directed flange member 26. This radial flange has its forward face chamfered to provide a valve seat 27 and the flange also defines a lateral fuel passage 28 communicating with the radial fuel passage means 23. The lateral passage is held to exacting tolerances in order to accommodate pressure differential means 29 hereinafter described and contained on the valve stem 31.

The rearwardly opening hollow portion of the divider body, generally designated 32, has a substantially greater diameter than the forward extremity 24 of the body 21 with the interior surface being substantially cylindrical throughout its entire length. The exterior surface of the divider body 21 is formed with axially extending ridges 33 which are engaged by a locking clip 34. This arrangement prevents the divider body from becoming unthreaded from the nozzle at the union designated as 22.

Slidably journalled within the rear extremity 32 of the body is a valve guide member 36 which in its forward position (FIGURE 1) abuts that portion of the divider body housing the radial fuel passage means 23. A valve member, generally designated 37, comprises a valve head 38 and the previously identified valve stem 31 which is slidably journalled by means of a boss 39 on the stem supported within the valve guide member. The rear extremity of the valve stem is provided with fine threads 41 for a considerable portion of its axial length, and an axial groove 42 extending inwardly towards the boss a substantial length beyond the threaded extremity 41.

The valve head 38, when the device is assembled, extends axially outwardly of the valve seat 27 to provide an outwardly opening type of valve. The valve member where it traverses the lateral passage 28 is provided with a pressure differential flange or piston 29 which dimensionally has a diameter less than the passage diameter and thereby allows the fluid to reach the upstream side of the valve head.

A vernier valve adjusting mechanism, generally designated 43 in FIG. 1, is housed within the body's rear hollow portion 32. The valve adjusting mechanism 43 consists of an adjustment nut 44 threadedly received on the valve stem extremity. The adjusting nut is provided with a hub portion 46. The hub is provided on its circumferential surface with a plurality of axially extending serrations or splines 47. One face of the head of the adjusting nut is provided with a kerf 48 while the other face provides a flange 49 which is engageable by the vernier adjustment collar 51. The vernier adjustment collar means is illustrated in FIGURE 1 as being concentrically disposed about the hub portion 46 of the adjusting nut. The vernier collar is a substantially annular sleeve member and its internal cylindrical surface is provided with a plurality of serrations or splines 52 which complement and are adapted to disengageably engage the serrations or splines 47 on the adjusting nut hub portion. The rear rim or face 53 of the collar abuts and extends radially beyond the flange 49 of the adjusting nut to limit the rearward axial travel of the collar. The forward rim or face of the adjusting collar is provided with a plurality of dentils 54. The ratio between the dentils 54 and the serrations 52 has been determined to be most advantageous when the ratio is 24 serrations to 11 dentils.

A piston 56 is slidably positioned on the valve stem extremity and has an instruck tongue 57 engaging the groove 42 in the valve stem to prevent rotational displacement of the piston relative to the valve member 37. One face of the piston 56 is provided with a plurality of dentils 58 which complement and are adapted to disengageably engage with the dentils 54 on the vernier collar. The piston has a flange 59 having sliding contact with the cylindrical surface of the body. The flange 59 has a radial dimension greater than the collar to thus provide a rearwardly facing body. A biasing spring 61 is concentrically disposed about the valve stem member in compressive abutting relationship between an inset portion 62 of the piston and a recessed spring seat portion 63 of the valve guide member 36. The spring 61 urges the vernier mechanism 43 rearwardly which in turn carries the valve member 37 in a valve closing direction positioning the pressure differential area within the lateral passage 28 and causing the valve head 38 to engage the valve seat 27.

The rearwardly opening extremity of the divider body 21 is partially closed by a cupped-shaped cover 64 which encompasses the opening. The cover is held in position by a divider cover spring 66 which exerts a bias on the flange portion 67 of the cup and a spring seat 68 provided by the filter screen 16. A minute opening or orifice 69 of a predetermined size, provided centrally in the cover, allows for the ingress or egress of entrapped fluids and eliminates the complete entrapment of fluids which will detrimentally affect the valve operation. However, the cover orifice, the piston flange 56 and the cylindrical interior of rear extremity of the body 21, due to their predetermined dimensions and close tolerances, do control the rate of flow of the entrapped fluids. These elements in combination provide a control means which has the effect of providing a dashpot action on the valve member to control and dampen its movements and to eliminate erratic and undesirable valve action. The fluids entrapped in the body portion 32 will, however, be at substantially inlet fluid pressures.

The engagement between the serrations 52 on the vernier adjustment collar 51 and the serrations 47 on the divider adjustment nut hub 44 combine to provide a first clutch while the engagement between the dentils 54 on the collar and the dentils 58 on the piston 56 provide a second clutch.

In operation, fuel is supplied through the inlet port 12 to the fuel reservoir 17. Under an initial pressure it is allowed to pass unobstructedly into the primary tube 13 and thence to the combustion chamber of the jet engine. Fuel under the initial pressure is concomitantly introduced into the divider valve 19 through the fuel passages 23 to the hollow forward internal portion of the divider body 21 and into the rear cavity portion 32 housing the vernier adjusting mechanism 43. The fuel under this initial pressure surrounds the pressure differential or piston area 29 and reacts upon the upstream side of the valve head but when the initial fuel pressure is below a predetermined value it will be too low to exert sufficient force on the valve head to cause an axial movement in the valve member 37 in an opening direction, thus, the valve head 38 remains seated against the valve seat 27 formed on the body flange member 26.

The force opposing the opening pressures exerted by the fuel is adjustable by means of the vernier adjustment means 43. The vernier adjustment means can be changed to increase or decrease the axial forces exerted in the valve closing direction by the compression spring 61.

When it is desired to operate the jet engine at a greater rate of speed or to produce a greater amount of thrust, then the fuel pressure is increased by pumps not forming a part of this invention. As the fuel pressure is increased the pressure forces within the fuel passage 23 and the hollow rear cavity 32 will increase in equal amounts and will remain at substantially identical values thus creating a pressure balance across the boss 39, but at the same moment there will be created a considerable pressure drop across the fuel passage 23 and the downstream side of the valve head 38. This increased fuel pressure will increase the fuel reaction upon the back or upstream side of the valve head and will be of sufficient force or magnitude to overcome the force exerted by the compression spring 61 of the valve closing means 43 and the downstream pressure in the secondary tube. This increased pressure causes the valve member 37 to be moved in a valve opening direction with the valve head 38 moving away from the valve seat 27 allowing the fuel to flow into an intermediate chamber 71 and thence to the secondary tube 14 and on to the fuel combustion chamber of the jet engine via the tip end of the nozzle. Once the valve opens the rush of fuel flowing through the passage 28 will exert a kinetic force on the piston 29 and will cause the valve member 37 to move even more rapidly toward a valve open position. When the fluid pressure exerted on the piston 29 is counterbalanced by the bias of the spring 61, then the valve member will have attained a proper degree of valve opening and this degree of valve opening will be maintained for as long as the particular value of fluid pressure is maintained. This increased secondary fuel flow will, of course, increase the amount of combustion in the engine and result in increased thrust being developed. The dashpot action of the piston flange 56 and the body 21 tends to control and eliminate erratic or chatter movements of the valve during secondary fuel flow.

Since the engine manufacturers have established very strict rate tolerances for this secondary fuel flow it is desirable that the operation of the flow divider valve be controllable within these established and exacting tolerances. The vernier means herein described makes this finite control possible. When it is found that the secondary fuel flow is not within the tolerances, then the compressive forces exerted by the spring 61 on the valve member 37 can be increased or diminished to meet the established tolerances. This change of force can be accomplished in a rather simple manner. A tool is inserted in the rear end of the divider body to engage the flange 59 defining the peripheral portion of the piston 56. The tool does not abut the flange portion 53 of the collar 51 nor does it engage the adjusting nut 44. The pressure exerted on the tool will cause the piston 56 to depress the compression spring 61 thereby disengaging the dentiled second clutch member. During the disengagement of the dentiled collar from the piston, the nut which then carries the collar can be threaded inwardly or outwardly on the valve stem 31 an amount rotationally equal to one or more of the dentils to increase or decrease the degree of spring compression and the resulting spring pressure exerted on the piston. The nut is turned by a tool such as a screw driver engaging the nut kerf 48. This adjustment will provide for a primary or initial setting of the flow divider valve. If it is found that the flow divider valve is still not within tolerances and more exact adjustments are desired or required, then a second finite or refining adjustment can be made by inserting a second tool which will engage the flange 53 of the collar 51 only. The tool is used to exert an axial force upon the collar and piston to overcome the spring compression forces. This depression of the collar and piston causes the disengagement of the first clutch member while maintaining engagement of the dentils comprising the second clutch member. When the collar and adjusting nut serrations are disengaged, the nut can be independently threaded on the threaded extremity of the valve stem inwardly or outwardly thereby increasing or decreasing in very minute increments the spring compression and the amount of tension exerted by the spring member. Since there are a greater number of serrations 47 and 52 than there are dentils 54 and 58, a minute change in location of the serrations will cause a minute change in the piston position relative to the valve stem 31 and will result in a minute change of the force exerted by the compression spring 61. This fine change of spring compression will make the attainment of finite adjustments in the valve movements so as to obtain the exact flow tolerances required.

While there has been hereinbefore described what is at present time considered a preferred embodiment of the invention, it will be apparent that many and various changes and modifications may be made with respect to the embodiment illustrated without departing from the spirit of the invention.

It will also be understood therefore that all and any such changes and modifications as fall fairly within the scope of the present invention as defined in the appended claims are to be considered as part of the present invention.

We claim:

1. A vernier spring adjusting mechanism comprising, in combination: a stem having threads at one end; annular thrust piston means slidably but non-rotatably supported adjacent said one end of the stem; a spring concentrically disposed about said piston means in compressive relationship between said piston means and a fixed spring seat; a nut member threadedly received on said one end of the stem rearwardly of the thrust piston means; a collar member concentrically disposed about the stem between the thrust piston means and the nut member; a first clutch means between the collar member and the nut member for alternatively connecting and disconnecting the collar and the nut; and, a second clutch means between the thrust piston means and the collar for alternatively connecting and disconnecting the collar and thrust piston means.

2. a vernier spring adjusting mechanism of the type set forth in claim 1 in which the first clutch means is characterized by hub means on the nut member extending axially towards the thrust piston means, said hub having axially extending circumferentially spaced radial serrations, and complementing internal serrations formed on the collar, said serrations adapted to mesh when said collar and hub are in juxtaposition; and, in which the second clutch means is characterized by dentil means formed on the face of the thrust piston means extending towards the collar, and complementing dentil means formed on one face of the collar adapted to mesh with the thrust piston means dentils responsive to axial force exerted on the piston by said spring.

3. A vernier spring adjusting mechanism of the type set forth in claim 2 in which the collar serrations and dentils are formed in a ratio of 24 to 11, respectively.

References Cited in the file of this patent

UNITED STATES PATENTS

| | | |
|---|---|---|
| 835,390 | Beyer | Nov. 6, 1906 |
| 961,735 | Schutte | June 14, 1915 |
| 2,561,224 | Pischek et al. | July 17, 1951 |
| 2,593,884 | Ifield | Apr. 22, 1952 |
| 2,614,582 | St. Clair | Oct. 21, 1952 |
| 2,859,031 | Hansen | Nov. 4, 1958 |
| 2,964,310 | Stahlhuth | Dec. 13, 1960 |
| 3,018,792 | Brucker | Jan. 30, 1962 |